April 17, 1973     A. C. COOLEY     3,728,244

HIGH CURRENT DENSITY ELECTROLYTIC CELL

Original Filed Feb. 12, 1969

AUSTIN C. COOLEY
INVENTOR.

BY *Alfred P. Lorenzo*
*Walter O. Hodsdon*

ATTORNEYS

United States Patent Office 3,728,244
Patented Apr. 17, 1973

3,728,244
HIGH CURRENT DENSITY ELECTROLYTIC CELL
Austin C. Cooley, 1669 Lake Ave.,
Rochester, N.Y. 14650
Continuation of abandoned application Ser. No. 798,624,
Feb. 12, 1969. This application June 21, 1971, Ser.
No. 155,278
Int. Cl. B01r 3/00; C23b 5/68
U.S. Cl. 204—269                                    12 Claims

ABSTRACT OF THE DISCLOSURE

Apparatus for recovering a metal from a solution in which the metal is present in ionic form, including a pair of oppositely disposed electrodes sealed to and separated by an electrically non-conductive spacing element which forms a disk-shaped chamber through which the solution is circulated and means for impressing an electric potential across the electrodes to cause the metal ions in the solution to plate out on the electrode surface of lower potential. The apparatus is particularly well adapted to recovering silver from fixing solutions employed in photographic processing and permits such recovery to be effected at exceptionally high current densities.

---

This application is a continuation of application Ser. No. 798,624 filed Feb. 12, 1969, and now abanboned.

BACKGROUND OF THE INVENTION

(1) Field of the invention

This invention relates in general to electrolytic recovery of metals and in particular to a novel electrolytic apparatus for recovering a metal from a solution containing ions of the metal, for example, recovering silver from exhausted photographic fixing solutions. More specifically, this invention relates to an electrolytic cell through which a metal-ion-containing solution is circulated in order to plate out the metal on an electrode surface from which it can be readily removed.

(2) Description of the prior art

Recovery by electrolytic techniques of a metal from a solution which contains ions of such metal is well known. In its simplest terms, the process involves immersing a pair of electrodes in the electrolytic solution and impressing across the electrodes a voltage of sufficient magnitude to effect migration of the metal ions to the cathode and deposition of the metal on the cathode surface in the form of a coherent plate which is subsequently removed. Regardless of the design of the apparatus employed, it has been long been recognized that effective agitation of the solution must be provided to achieve a reasonable efficiency of recovery. Many of the electrolytic cells heretofore utilized for this purpose provide mechanical agitation of the solution by the use of inter-electrode stirring devices, e.g., rotating paddle wheels or impellers positioned between anode and cathode. Such cells are typically of rather complex construction and must provide a relatively large space between anode and cathode to accommodate the stirring device. As a result of this large electrode spacing, the diffusion path for the metal ions is long and the need for thorough agitation of the solution is correspondingly increased. Moreover, because of the location of the stirring device, only a relatively thin layer of metal can be permitted to build up on the cathode before it becomes necessary to strip it off so as to avoid the possibility of contact with the stirring device. Electrolytic cells in which agitation of the electrolytic solution is provided solely by means of fluid flow, so that mechanical stirring devices are not needed, have also been proposed heretofore; but these cells confine the solution within an annular chamber between concentrically disposed cylindrical electrodes and, consequently, are usually quite complex in design.

SUMMARY OF THE INVENTION

In accordance with this invention, there is provided an electrolytic cell of novel construction which effectively avoids the disadvantages of the apparatus of the prior art referred to hereinabove. As compared with cells comprised of concentrically disposed cylindrical electrodes, the apparatus of this invention has the advantage of greater simplicity in construction, while still eliminating the need for inter-electrode stirring devices, and it also provides an improved configuration for current flow with the result that higher current densities than were heretofore feasible can be used.

The electrolytic cell of this invention is comprised of a pair of oppositely disposed sheet electrodes sealed to and separated by an electrically non-conductive spacing element which is of such configuration that together with the electrodes it defines a disk-shaped chamber. An electric potential of appropriate magnitude is impressed across the electrodes by any suitable means. The solution undergoing treatment is circulated through the disk-shaped chamber at a high rate in such manner as to establish a spiral flow path, this being accomplished by providing a centrally located opening for passage of the solution in at least one of the electrodes and a conduit which serves to direct the flow of solution in a direction which is substantially tangential to the circumference of the chamber. This conduit preferably takes the form of a passageway within the spacing element, the longitudinal axis of which is substantially tangential to the circumference of the disk-shaped chamber, but a suitably positioned pipe or duct which opens into the chamber and passes through the spacing element or through either electrode can also be employed, if desired. While it is preferred that the solution enter the chamber via the tangentially positioned conduit and exit via the centrally located opening, it is also feasible to operate with the reverse flow path. In either instance, the solution should be passed through the chamber at a high flow rate so that it whirls about in a turbulent manner.

Among the major advantages of the apparatus of this invention are its simplicity of design and consequent low cost, its freedom from moving parts so that construction and maintenance are greatly simplified, its amenability to very close spacing of the electrodes with essentially full utilization of the space available to permit build up of a metal deposit of adequate thickness, and its high ratio of cross-sectional area to cathode area which permits operation at very high current density.

DESCRIPTION OF THE PREFERRED EMBODIMENTS

Figure 1:
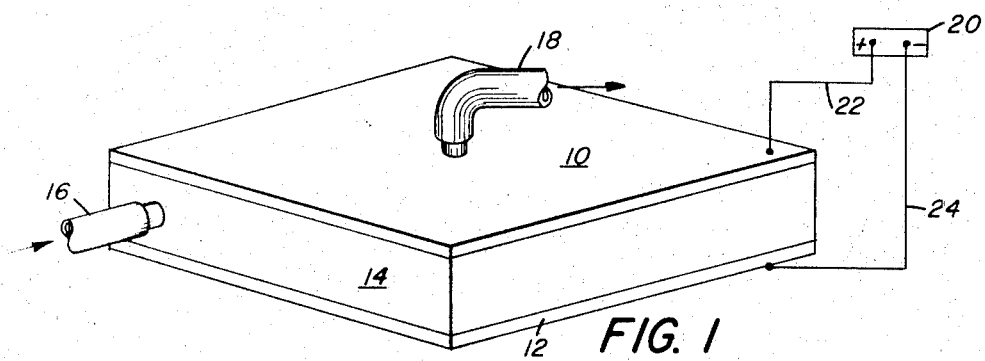
FIG. 1 is a perspective view of an electrolytic apparatus constructed in accordance with this invention.

Referring to FIG. 1, there is shown an electrolytic cell made up of a smooth flat square-shaped stainless steel element or sheet 10 which serves as an anode, an oppositely disposed smooth flat square-shaped stainless steel element or sheet 12 which serves as a cathode, and an electrically nonconductive spacing element 14, composed of a clear rigid plastic material, which separates anode 10 and cathode 12. Extending from one side of spacing element 14 is inlet pipe 16, while outlet pipe 18 is positioned within an opening cut in the center of anode 10. A unidirectional electric potential is impressed across anode 10 and cathode 12 by means of power supply 20 connected from its positive terminal to anode 10 and from its negative terminal to cathode 12 by conductive wires 22 and 24, respectively.

Figure 2:
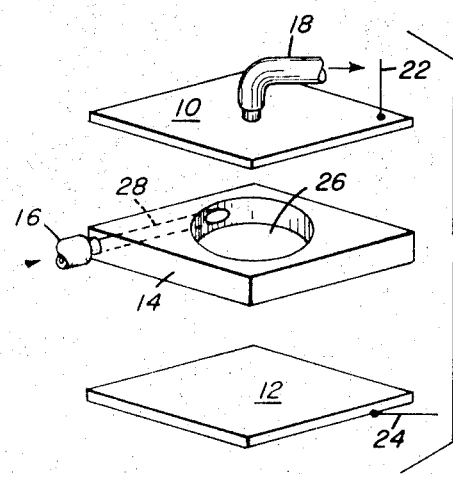
FIG. 2 is an exploded view of the apparatus of FIG. 1, particularly illustrating the relationship between the electrodes and the spacing element.

The configuration of spacing element 14, and the manner in which it is assembled together with anode 10 and cathode 12 to form an electrolytic cell, is best shown in FIG. 2, which provides an "exploded view" of the components shown in assembled form in FIG. 1. As will be apparent from consideration of FIG. 2, within spacing element 14, which has a square periphery of the same dimension as anode 10 and cathode 12, there is formed a large circular opening 26 at the circumference of which an elongated passageway 28 is formed, this passageway having a longitudinal axis that is tangential to the circumference of opening 26. It will be observed that when anode 10 and cathode 12 are brought together with spacing element 14 therebetween, utilizing suitable fastening means (not shown) such as screws, bolts, clamps, and the like, there is formed a hollow disk-shaped chamber which is bounded on one side by anode 10 and on the opposing side by cathode 12 and is peripherally bounded by spacing element 14. Since passageway 28 extends from inlet pipe 16 at one end to opening 26 at its other end, solution entering inlet pipe 16, as indicated by the arrow in FIG. 1, is able to flow into the aforesaid disk-shaped chamber and then out of this chamber via outlet pipe 18. Suitable means (not shown) are provided for pumping the solution to inlet pipe 16 at an appropriate rate and for collecting the solution emerging from outlet pipe 18.

Anode 10, cathode 12 and spacing element 14 can be held together sufficiently tightly to provide a fluid-tight seal between the engaging surfaces in any convenient manner permitting easy disassembly of the cell. If necessary, an effective seal may be assured by inserting an O-ring sealing element into each face of spacing element 14.

In operation, the solution from which metal is to be recovered, for example, an exhausted fixing solution from which silver is to be recovered, is pumped at a high rate to inlet pipe 16 and enters the disk-shaped chamber of the cell along a tangential flow path with the result that it tends to whirl about along a spiral path before emerging at high velocity from outlet pipe 18. An electric potential of suitable magnitude is continuously maintained across anode 10 and cathode 12 and, as a result of this potential, the metal ions in the solution migrate to cathode 12 and plate out on the surface thereof. After a desired thickness of metal has been built up on cathode 12, the cell is disassembled, the metal plate is peeled off or otherwise removed, and the cell is then reassembled and put back into operation.

Figure 3:
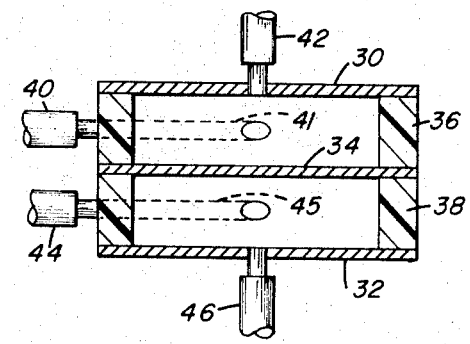
FIG. 3 is a cross-sectional view of an alternate embodiment to that illustrated in FIGS. 1 and 2 which is made up of three electrodes and two identical spacing elements arranged in the form of a "double sandwich."

An alternate embodiment of the invention is illustrated in FIG. 3. In this embodiment, the cell is constructed as a "double sandwich" in which two identical anodes 30 and 32 are positioned on opposite sides of cathode 34 with identical spacing elements 36 and 38 held between cathode 34 and anodes 30 and 32, respectively. Solution is supplied to the upper disk-shaped chamber via inlet pipe 40 and passageway 41 and exits via outlet pipe 42 and is supplied to the lower disk-shaped chamber via inlet pipe 44 and passageway 45 and exits via outlet pipe 46. An electric potential is maintained between each of anodes 30 and 32 and cathode 34 by suitable circuitry and power supply means (not shown). This form of construction has the advantage that it permits full use to be made of all the available plating surface. Thus, in the embodiment illustrated in FIGS. 1 and 2, the metal plate is deposited only on the interior surface of cathode 12, whereas in the embodiment illustrated in FIG. 3 both faces of cathode 34 are plated and, accordingly, double the recovery rate is achieved without any increase in cathode area. If desired, the apparatus can also be constructed as a "double sandwich" utilizing one anode and two cathodes each of which would be plated on one face only. This would provide a more compact arrangement than two separate cells but, of course, would not provide the advantage of plating over all available cathode area. It will also be apparent that a cell providing more than two disk-shaped chambers can be constructed to provide increased capacity where there is a large volume of solution to be treated.

Figure 4:
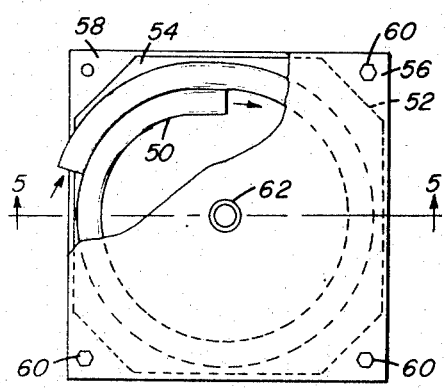
FIG. 4 is a top plan view of still another embodiment in which the spacing element is constructed in tubular form rather than in plate form as in FIGS. 1 to 3.
Figure 5:
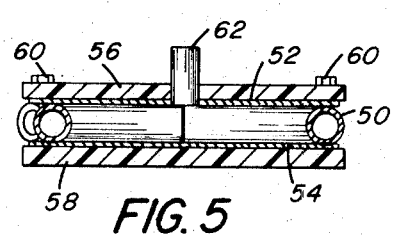
FIG. 5 is a sectional view taken along the line 5—5 of FIG. 4.

A further embodiment of the invention, which has the advantage of even greater simplicity, is illustrated in FIGS. 4 and 5. In this embodiment, the spacing element takes the form of an electrically non-conductive flexible tubes 50 which has been bent into a circular configuration and is tightly held between a smooth flat sheet of graphite 52, which serves as anode, and a smooth flat sheet of stainess steel 54, which serves as cathode, to form therewith a disk-shaped chamber. Tube 50 is held in the desired circular configuration by an adhesive applied between the overlapping end portions thereof. In order to provide rigidity to the structure, backing plates 56 and 58, which are composed of a clear rigid plastic material, are employed to support anode 52 and cathode 54, respectively, and are fastened together by bolts 60. Similar backing plates can, of course, also be employed in the embodiments of the invention illustrated hereinabove, if desires. Backing plates 56 and 58 are square in shape, while anode 52 and cathode 54 are of essentially the same size and shape as the backing plates except that the corners of each have been cut away to faciiltate the use of bolts as fastening means. Thus, anode 52, cathode 54, and tube 50 are held in place in the assembled apparatus solely as a result of the force exerted by the backing plates and this force is controlled by tightening bolts 60 to ensure a fluid-tight assembly. The solution to be treated for recovery of metal therefrom is pumped by any suitable pumping device (not shown) into the external end of tube 50, as shown by the arrow in FIG. 4, and flows through tube 50 and into the disk-shaped chamber and thence along a spiral path within the chamber to exit by way of outlet pipe 62. The necessary electric potential between anode 52 and cathode 54 is maintained by appropriate connections to a suitable power supply (not shown) and, as with the other embodiments illustrated, when the metal plate has built up to a suitable thickness on cathodes 54, the cell is disassembled and the metal plate peeled off or otherwise removed, and the cell is then reassembled and put back into operation. As will be apparent, this same form of construction, in which a flexible tube is utilized as the spacing element, can also be employed in an apparatus of the "double sandwich" type.

It is an important feature of the apparatus of this invention that the inlet and outlet means to the cell be designed to provide a spiral flow path for the solution. This provides substantial residence time within the chamber, even though the chamber is of very small volume, as well as adequate turbulence within the solution, and promotes the formation of a pure, coherent, fine grain metal deposit. While it is preferred to admit the solution to the cell at the periphery of the disk-shaped chamber and withdraw it through the electrode opening near the center of the chamber, it is also feasible to operate with the solution entering through the central opening in the electrode and exiting at the periphery. Various means for providing the desired flow path can be provided. A particularly convenient and inexpensive procedure is to use a flexible tube of suitable diameter as both the electrically non-conductive spacing element and the means for admitting or discharging the solution, as shown in FIGS. 4 and 5. Where the spacing element is constructed in the form of a thick flat sheet of non-conductive material, as in FIGS. 1, 2 and 3, it is most convenient to drill a hole tangentially to the disk-shaped chamber and tap it to take standard pipe fittings. Instead of drilling a hole in the spacing element in this manner, it would be possible to insert a pipe or duct into the chamber through the spacing element, or through an opening in either electrode, and position it so that solution would flow therefrom in a direction substantially tangential to the chamber. However, this would complicate the construction and no corresponding advantage would be gained thereby.

In accordance with this invention, either the anode or the cathode can be provided with an opening, preferably located at or at least reasonably near to its center, to serve as inlet or outlet means for the solution and it would also be feasible to provide such an opening in both electrodes, if desired. However, it is preferred that there be only one such opening and that it be in the anode so that the full surface area of the cathode will be available for deposit of the metal plate.

The anode and cathode are advantageously constructed in the form of thin smooth flat sheets, but it is not essential that the surfaces thereof be smooth and flat. For example, the anode and cathode can, if desired, be provided with a surface having a plurality of adjacent grooves of gradually diminishing radius formed therein, such grooves serving to promote establishment of a spiral flow path for the solution. It is preferred that both anode and cathode be made of stainless steel, or the anode of graphite and the cathode of stainless steel. However, other materials known to the art for use in forming electrodes, for example, brass, platinum, platinized titanium or carbon foil, can be utilized in construction of the apparatus of this invention, if desired.

The spacing element must be electrically non-conductive so as not to cause short circuiting between anode and cathode and must also be inert to the solution. It can be formed from any material that possesses these characteristics. For example, where the spacing element takes the form of a rigid plate, it can be made of glass, hard rubber or wood, or of a synthetic polymeric material such as poly(methyl methacrylate) or other similar polymer. When backing plates are employed they can be constructed from these same materials. The spacing element is preferably made of a transparent material to permit observation of the build up of the layer of metal on the cathode, but where an opaque material is used this can still be accomplished by equipping it with a suitable "window." The tubular form of spacing element can be made, for example, from rubber or any flexible plastic material which is inert to the solution. Whatever type of spacing element is employed, it should be designed to provide a fluid-tight seal with the electrodes that will permit high agitation of the solution without leaks developing. The necessary agitation is readily achieved by providing a high pumping capacity, with consequent high velocity flow through the cell.

The electric current required to operate the apparatus is provided in accordance with conventional practice in the art. Thus, the current may be provided by, for example, a D.C. power supply unit including a rectifier and voltage regulator or it may be provided by a battery.

So long as a disk-shaped chamber is provided for treatment of the solution, the size and external configuration of the cell are matters of design choice and can be widely varied depending upon the specific requirements of the use to which the apparatus is to be put. For example, the cell may be square, rectangular or circular in its outside dimensions. The spacing between the electrodes is, however, an important factor and should be made as small as is practical so as to minimize the distance the metal ions must travel to reach the plating surface and to provide for effective agitation at practical circulation rates. On the other hand, the electrodes must be spaced far enough apart to allow a layer of metal of substantial thickness to build up so that the frequency with which the cell must be disassembled to recover the metal does not become excessive. Ordinarily, a distance between the electrodes of from about 0.4 inch to about 2 inches will be appropriate, but smaller or greater spacings are also fully within the contemplation of this invention. It is preferred that the anode and cathode be parallel to one another, i.e., the spacing be the same at all points on the opposing electrode surfaces, but some deviation from parallelism is not seriously detrimental. The greatest degree of plating occurs in the region where the electrodes are closest together so that uniformity in plating thickness requires that the spacing be uniform. If there are major differences in spacing from one region to another, the available interelectrode space will not be efficiently utilized since the metal tends to rapidly bridge across between the electrodes at the point where they are closest together and it will be necessary to stop the operation of the cell before such bridging occurs. For this reason, it is preferred that the anode and cathode be flat, smooth and parallel, or at least substantially parallel.

A preferred method of operating the apparatus of this invention is to pump the metal-ion-containing solution from a holding tank through the cell and to recirculate it a sufficient number of times to achieve the desired reduction in the concentration of metal in the solution. The solution should be pumped at a sufficiently high rate to achieve the necessary agitation of the solution within the chamber. In this regard, it is preferred to provide a flow rate of at least about 5, and more preferably at least about 20, cubic feet of solution per cubic foot of chamber volume per minute.

The apparatus of this invention can be operated at either constant voltage or constant amperage, as desired. If it is operated at constant voltage, the amperage decreases as the metal ion concentration in the solution decreases and, in consequence, the rate of recovery decreases. On the other hand, if the cell is operated at constant amperage, the voltage rises as the metal ion concentration decreases but the rate of recovery is constant. In continuous processing, the metal ion concentration will reach an equilibrium and the mode of operation will not matter, but in batch operation the choice of constant voltage or constant amperage operation can be an important factor. For example, in recovering silver from photographic fixing solutions by a batch operation it is preferable that the apparatus be operated at constant voltage rather than at constant amperage so as to avoid the risk of the voltage rising to the point where sulfiding will occur, i.e., where sulfide ions will be removed from the fix and plate out with the silver, usually as silver sulfide. Good results are ordinarily obtained with photographic fixing solutions by operation of the apparatus of this invention at voltages of from about 0.3 to about 3 volts, with the preferred voltage being in the range of from about 1 to about 2.5 volts.

As will be apparent to one skilled in the art, the apparatus described herein will find utility in treatment of many different metal-ion-containing solutions and reference to photographic fixing solutions is made herein merely as an example of a use to which it is particularly well suited. Thus, for example, in addition to fixing solutions, cell liquor recovered from electrolytic cells utilized in silver electro-refining processes can be successfully treated with the apparatus of this invention to recover the silver therefrom. In application to recovery of silver from spent fixing solution, the composition of the fix is not important so that the apparatus may be employed with equal facility with, for example, basic non-hardening, acid hardening, or ammonium hypo types of fixing solution. Good results are obtained with fixing solutions having an initial silver concentration of from as little as about one gram per liter to as much as about 10 grams per liter. The silver plate which is formed can be peeled from the cathode, or removed by other suitable means, which may operate by mechanical or chemical action as is known in the art. If desired, the cathode may be replaced with a new one as soon as a sufficient plate thickness is achieved and the used cathode may be shipped by the user to a silver refiner for recovery of the silver. The desilvered fixing solution which is recovered may be re-used, following suitable replenishment in a manner known to the art.

As previously indicated, the apparatus of this invention is especially well adapted to operation at a high current density, i.e., the ratio of the current in amperes to the cathode area. Current densities of up to 30 amperes per square foot of cathode area, and in some instances even up to as much as 50 amperes per square foot, are feasible in treating spent photographic fixing solutions in the apparatus of this invention. In consequence, it provides a high rate of recovery of silver since, for a given cathode area, the recovery rate is directly proportional to the current density.

The maximum current density that can be employed with an electrolytic cell is determined in part by the "cell constant"; this term being employed herein and in the appended claims to mean the spacing between the electrodes divided by the cross-sectional area between the electrodes as seen by the flow of current. For the apparatus of this invention, the relationship is expressed by the equation:

$$k = \frac{x}{A}$$

where $k$ = cell constant
$x$ = perpendicular distance between electrodes
$A$ = cross-sectional area between electrodes while for apparatus in which the electrodes are concentric cylinders the relationship is expressed by the equation:

$$k = \frac{\ln \frac{R_1}{R_2}}{2\pi I}$$

where $k$ = cell constant
$\ln$ = natural logarithm
$R_1$ = radius of outer cylindrical electrode
$R_2$ = radius of inner cylindrical electrode
$\pi$ = ratio of the circumference of a circle to its diameter, i.e., 3.1415
$H$ = height of the cylindrical electrodes The cell constant is a characteristic of the shape of the conducting solution in the cell and can, of course, be varied by changing the dimensional relationships. With the apparatus of this invention, it is preferred that the geometry be chosen such that the cell constant will be less than about 0.01 cm.$^{-1}$. As an illustration, a cell with flat parallel electrodes, a cathode area of one square foot, and a spacing between electrodes of one inch will have a cell constant of about 0.00275 cm.$^{-1}$.

For a given electrode spacing and cathode area, the cell constant for the apparatus described herein is lower than that for the prior art apparatus constructed with concentrically disposed cylindrical electrodes and, as a result of this fact, the maximum current density which can be employed is greater. To get the same cell constant with concentric cylinders as is provided with the apparatus of this invention, it is necessary to have either a smaller electrode spacing, and thus less capacity, or a greater cathode area, and thus a larger and more costly apparatus. This is an important feature of the apparatus of this invention and serves in part to distinguish it from electrolytic apparatus proposed heretofore for use in metal recovery.

Apparatus constructed in accordance with the disclosure herein was operated to recover silver from exhausted photographic fixing solutions with excellent results. Both anode and cathode were made from thin stainless steel sheeting and had an area of one square foot, while the spacing element was made from rigid transparent poly (methyl methacrylate) with a thickness of one inch. The solution was pumped into the cell via a tangential inlet port drilled in the spacing element and exited via an opening at the center of the anode. In one series of tests, a fixing solution having an initial silver concentration of 2.7 grams per liter was desilvered to a concentration of less than 0.2 gram per liter utilizing voltages ranging from 2.2 to 2.8 volts and current densities ranging from 9.5 to 30 amperes per square foot with plating rates ranging from 0.54 to 1.02 grams per minute. In a second test series, a fixing solution having an initial silver concentration of 9 grams per liter was desilvered to a concentration of less than 0.2 gram per liter utilizing voltages ranging from 1.6 to 2 volts and current densities ranging from 10 to 30 amperes per square foot with plating rates ranging from 0.71 to 1.76 grams per minute. Observation of the cell indicated that the silver plated out as a coherent and fine-grained deposit of uniform thickness over the cathode surface. In other tests, the same cell was successfully operated at current densities of as high as 50 amperes per square foot. Similar good results were obtained with a second cell in which clear flexible tubing with an internal diameter of one-half inch was utilized as the spacing element and the fixing solution was pumped into one end of the tubing, as hereinbefore described.

The invention has been described in detail with particular reference to preferred embodiments thereof, but it will be understood that variations and modifications can be effected within the spirit and scope of the invention.

I claim:

1. An apparatus for recovering a metal from a solution containing ions of said metal comprising
    a hollow disk-shaped chamber having first and second spaced substantially flat parallel end walls, and an annular side wall of dielectric material between said end walls and peripherally bounding said chamber, one of said end walls comprising an anode of electrically conductive material and the other of said end walls comprising a cathode of electrically conductive material, at least one of said end walls being provided with a discharge opening therein at about the center thereof for passage of said solution therethrough;
    an inlet conduit through said annular side wall for passage of said solution communicating with said chamber and so constructed and arranged as to direct the flow of said solution in a direction which is substantially tangential to said chamber;
    said anode and cathode being adapted to be connected to means for impressing an electrical potential, whereby when said solution is passed through said chamber metal ions in said solution are caused to plate out on said cathode.

2. An apparatus for recovering a metal from a solution containing ions of said metal comprising
a pair of oppositely disposed substantially flat parallel electrodes at least one of which is provided with a discharge opening therein at about the center thereof for passage of said solution therethrough;
an electrically non-conductive generally annular spacing element sealed to and separating said electrodes and defining therewith a hollow disk-shaped chamber in fluid communication with said opening which is bounded on one side by one of said electrodes and on the opposing side by the other of said electrodes and is peripherally bounded by said spacing element; and
an inlet conduit through said annular side wall for passage of said solution communicating with said chamber and so constructed and arranged as to direct the flow of said solution in a direction which is substantially tangential to said chamber;
said anode and cathode being adapted to be connected to means for impressing an electrical potential, whereby, when said solution is passed through said chamber metal ions in said solution are caused to plate out on said cathode.

3. Apparatus as defined in claim 2 wherein the electrodes are smooth flat sheets and the opposing surfaces of the electrodes are substantially equidistant from one another at all points thereon.

4. Apparatus as defined in claim 3 wherein the opposing surfaces of the electrodes are spaced apart a distance in the range from about 0.4 to about 2 inches.

5. Apparatus in accordance with claim 2, also comprising means for impressing a D.C. electrical potential across said electrodes.

6. An apparatus for recovering a metal from a solution containing ions of said metal, comprising:
a pair of oppositely disposed substantially flat parallel electrodes at least one of which is provided with an outlet opening therein at about the center thereof for passage of said solution therethrough;
an electrically non-conductive flexible tube arranged in a circular configuration sealed to and separating said electrodes and defining therewith a disk-shaped chamber in fluid communication with said outlet opening which is bounded on one side by one of said electrodes and on the opposing side by the other of said electrodes and is peripherally bounded by said tube, the opening within said tube constituting an inlet conduit and being accessible from outside said apparatus at one end and in communication with said chamber at its opposite end to thereby permit passage of said solution through said chamber, the axis thereof adjacent said opposite end being generally tangent to said chamber;
said electrodes being adapted to be connected to means for impressing an electric potential across said electrodes, whereby when said solution is passed through said chamber metal ions in said solution are caused by plate out on the electrode which is of lower potential.

7. An apparatus for recovering a metal from a solution containing ions of said metal, comprising:
a stationary substantially flat first end wall comprising a first electrode;
a pair of stationary substantially flat second and third end walls comprising second and third electrodes disposed one on each side of said first wall in spaced parallel relation thereto;
a pair of electrically non-conductive generally annular side walls between said first end wall and each of said second and third end walls, thereby defining two disk-shaped chambers peripherally bounded by said side walls and having said first electrode as a common wall;
each one of said chambers having a first opening at about the center thereof and a second opening at the periphery thereof, for flow of solution therebetween, each second opening being in an end of a conduit which extends through one of said side walls and is so constructed and arranged that solution directed therethrough flows in a direction which is substantially tangential to said chamber;
said first electrode being adapted to be connected to one side, and said second and third electrodes both being adapted to be connected to the opposite side of means for impressing an electrical potential, whereby when such solution is passed through each of said chambers metal ions in solution plate out on the electrode or electrodes which are cathodic.

8. An apparatus in accordance with claim 7 wherein said first electrodes is a cathode, and both said second and third electrodes are anodes.

9. An apparatus in accordance with claim 7 wherein said first electrode is an anode, and both said second and third electrodes are cathodes.

10. Apparatus as defined in claim 7 wherein each of said chambers is hollow.

11. An apparatus for recovering a metal from a solution containing ions of said metal, comprising:
a substantially flat cathode;
a pair of anodes substantially parallel to said cathode, one disposed opposite each face of said cathode, and each of which is provided with an opening therein at about the center thereof for passage of said solution therethrough;
a pair of electrically non-conductive generally annular spacing elements respectively sealed to and separating said cathode from each of said anodes so as to define two disk-shaped chambers each of which is bounded one one side by one of said anodes and on the opposing side by said cathode, is peripherally bounded by one of said spacing elements, and is in fluid communication with one of said openings, each of said spacing elements having inlet passageway therein for passage of said solution, said passageway communicating with the chamber bounded by such spacing element and having the axis thereof adjacent the outlet thereof positioned generally tangent to said chamber so as to direct flow of said solution in a direction which is substantially tangential to such chamber;
said cathode and anodes being adapted to be connected to means for impressing an electric potential across said cathode and each of said anodes, whereby when said solution is passed through each of said chambers metal ions in said solution are caused to plate out on both faces of said cathode.

12. An apparatus for recovering a metal from a solution containing ions of said metal, comprising:
a stationary substantially flat cathode;
a pair of stationary substantially flat anodes disposed one on each side of said cathode in spaced parallel relation thereto;
a pair of electrically non-conductive generally annular spacers respectively sealed between said cathode and each of said anodes, thereby defining two disk-shaped chambers peripherally bounded by said spacers and having said cathode as a common wall;
each one of said chambers having a first opening at about the center thereof and a second opening at the periphery thereof, for flow of solution therebetween, each second opening being in an end of a conduit which extends through one of said spacers, the axis of each conduit being generally tangent to said chamber;
said cathode and said anodes being adapted to be connected across means for impressing an electrical potential, whereby when such solution is passed through each of said chambers metal ions in solution plate out on both faces of said cathode.

References Cited

UNITED STATES PATENTS

| | | | |
|---|---|---|---|
| 814,764 | 3/1906 | Bailey | 204—276 X |
| 897,633 | 9/1908 | Landis | 204—275 X |
| 2,997,438 | 8/1961 | James et al. | 204—276 X |
| 3,003,942 | 10/1961 | Cedrone | 204—276 X |
| 3,427,237 | 2/1969 | Morris | 204—275 X |

FOREIGN PATENTS

| | | | |
|---|---|---|---|
| 916,438 | 1/1963 | Great Britain | 204—272 |
| 14,631 | 3/1897 | Switzerland | 204—263 |
| 446,900 | 8/1942 | Belgium | 204—275 |

JOHN H. MACK, Primary Examiner

R. J. FAY, Assistant Examiner

U.S. Cl. X.R.

204—109, 275